United States Patent

Kaufer et al.

Patent Number: 5,445,048
Date of Patent: Aug. 29, 1995

[54] STEERING WHEEL

[75] Inventors: Helmut Kaufer, Mettmann; Maximiliam Grimm, Hamburg; Martin Kreuzer, Kleinwallstadt, all of Germany

[73] Assignee: Kolbenschmidt Aktiengesellschaft, Neckarsulm, Germany

[21] Appl. No.: 99,771

[22] Filed: Jul. 30, 1993

Related U.S. Application Data

[63] Continuation of Ser. No. 854,940, Mar. 19, 1992, abandoned.

[30] Foreign Application Priority Data

Mar. 20, 1991 [DE] Germany .................. 41 08 973.1

[51] Int. Cl.$^6$ .................. B62D 1/04; B23B 5/16
[52] U.S. Cl. .................. 74/552; 264/275; 428/327
[58] Field of Search .................. 74/552, 558; 264/275, 264/279, 271.1; 428/327, 423.7, 395

[56] References Cited

U.S. PATENT DOCUMENTS

| | | | |
|---|---|---|---|
| 4,468,978 | 9/1984 | Takahara et al. | 74/552 |
| 4,635,500 | 1/1987 | Overcashier et al. | 74/552 |
| 4,758,470 | 7/1988 | Koyama | 428/327 |
| 4,761,333 | 8/1988 | Takimoto et al. | 428/327 |
| 4,800,775 | 1/1989 | Iuchi | 74/552 |
| 4,811,472 | 3/1989 | Kobayashi | 264/275 X |
| 4,875,387 | 10/1989 | Henigue | 74/552 |
| 4,876,915 | 10/1989 | Iuchi | 74/552 |
| 5,178,036 | 1/1993 | Haldenwanger et al. | 74/552 |

FOREIGN PATENT DOCUMENTS

| | | | |
|---|---|---|---|
| 0022679 | 1/1981 | European Pat. Off. | 74/552 |
| 0074473 | 3/1983 | European Pat. Off. | |
| 0292038 | 5/1987 | European Pat. Off. | 74/552 |
| 0309316 | 3/1989 | European Pat. Off. | 74/552 |
| 1478354 | 3/1967 | France . | |
| 2924603 | 12/1980 | Germany . | |
| 1450045 | 9/1976 | United Kingdom . | |
| 2061848 | 5/1981 | United Kingdom | 74/552 |

OTHER PUBLICATIONS

M. Bartels, "Computer Aided Engineering in der Kustoff-Teile-Entwicklung", Aotomobiltechnische Zeitschrift, vol. 85, No. 10, Oct. 1983, p. 608.

*Primary Examiner*—Vinh T. Luong
*Attorney, Agent, or Firm*—William C. Gerstenzang; Sprung Horn Kramer & Woods

[57] ABSTRACT

In order to impart an adequate functional stiffness to a steering wheel comprising an injection-molded skeleton made of partly crystalline thermoplastic plastic, the skeleton of the steering wheel has a press-stretched structure.

1 Claim, 2 Drawing Sheets

STEERING WHEEL

This application is a continuation of application Ser. No. 854,940, filed Mar. 19, 1992, abandoned.

DESCRIPTION

This invention relates to a steering wheel, preferably for steering systems of motor vehicles, comprising a steering wheel skeleton which has been made by injection molding from a partly crystalline thermoplastic plastic, particularly polypropylene, polyethylene, and polyamide, and which is optionally sheathed by a plastic layer, which is capable of plastic deformation under an impact and preferably consists of polyurethane integral foam, and to a process of manufacturing the steering wheel skeleton.

BACKGROUND OF THE INVENTION

In a steering wheel skeleton it is presently preferred to use steel for the spokes of the steering wheel, steel for the rim of the steering wheel, and diecast aluminum for the hub of the steering wheel and each joint between the rim and the spokes of the steering wheel is welded. Disadvantages of that standard steering wheel skeleton are its relatively heavy weight and its high mass moment of inertia.

The rotary unbalance of the wheels on the rear axle gives rise to horizontal oscillations of the body of the vehicle and, as a result, to vertical oscillations of the steering wheel. In order to eliminate the resulting shaking of the steering wheel, the mass of the steering wheel should be minimized.

In front wheel-driven and all wheel-driven motor vehicles an overshooting of the steering wheel often occurs when the steering wheel is permitted to turn back after a cornering and the maximum driving force is used for an acceleration at the same time. The resulting oscillations of the vehicle about the roll axis and the vertical axis (rolling and yawing) can be influenced to stabilize the vehicle if the steering wheel has a small moment of inertia, i.e., by a small flywheel mass. A decrease of the moment of inertial of the steering wheel will have a strong stabilizing action on the vehicle. If the specific requirements to be met by the steering wheel to optimize the ride comfort and the handling of a motor vehicle are considered in combination, the following design features will become apparent for the steering wheel:

light weight; the mass should be as close as possible to the axis of rotation (shaking, flutter) and moment of inertia or flywheel mass determined as a compromise between the desire to avoid angular rotational oscillations of the steering wheel and the desire to avoid an overshooting of the steering wheel; the compromise may be different for different vehicles.

The calculation of the flywheel moment shows that in a steering wheel having predetermined dimensions, i.e., a predetermined diameter, the moment of inertia can be influenced only by a decrease of the masses which can be associated with the radius of the steering wheel.

The skeleton of the steering wheel has a somewhat smaller mass moment of inertia and will be somewhat lighter in weight if it has a hub consisting of an aluminum diecasting, spokes made of steel, and a tubular rim made of steel and each joint between the rim and the spokes is constituted by a diecast aluminum sleeve, which is made in one casting operation with the skeleton of the steering wheel, but the manufacture of that steering wheel skeleton is compartively more expensive.

The mass moment of inertia and the weight of a steering wheel can be reduced further if the hub is made of diecast aluminum, the spokes and the rim are made of a wrought aluminum alloy, and each joint between the rim and the spokes is made by a diecast aluminum sleeve. To compensate the adverse influence of the casting pressure on the rim of the steering wheel, that rim must be reinforced by nipples at the cast-round portions. The technologies required for the manufacture of such a steering wheel skeleton involve a relatively high expenditure.

DESCRIPTION OF RELATED ART

EP-A-0 292 038 describes a design of a steering wheel skeleton, in which the hub and the spokes of the steering wheel and the cast portions surrounding the spokes at the rim of the steering wheel have integrally been made as an aluminum diecasting and in dependence on the desired moment of inertia the rim of the steering wheel is solid or tubular and is made of steel or aluminum or of an aluminum alloy.

Steering wheel skeletons made of thermoplastic plastics, preferably polyamides having a relatively high molecular weight, by injection molding (DE-U-7,531,072) have a very low mass moment of inertia and are light in weight, but such skeletons have not yet been adopted in practice because they do not meet the most important strength requirements. For instance, in the torsion test, in which the stiffness of the steering wheel is determined in that a torque of 250 Nm is applied for one minute, the permanent deformation must not exceed 1%. In the static bending test, which serves to indicate the strength under supporting forces acting in the direction of travel, a force acting in the direction of straightahead travel must not result in a permanent deformation of the steering wheel by more than 1.5 mm when that portion of the steering wheel which extends through the larger angle at the circumference is subjected to a force of F=380 newtons in the direction of the axis of the steering wheel. To test the fatigue of the material, the skeleton of the steering wheel must withstand at its weakest point for more than 100,000 load cycles a cyclic bending force of F=±200 newtons. Such requirements are met by the steering wheel skeleton which is shown in DE-A-3,685,372 and in which the hub and spoke are made of thermoplastic and optionally fiber-reinforced plastic and said hub and spoke as well as the rim of the skeleton are sheathed by a layer of a deformable plastic. In dependence on the desired mass moment of inertia the rim of the steering wheel is made of steel or a light alloy or of wound continuous glass fibers embedded in plastic. In a steering wheel having given dimensions, the moment of inertia of a steering wheel having the smallest possible mass can be varied in dependence on the type of vehicle in that the rims of the steering wheels differ in design whereas the hub geometry is the same and the spoke geometry is selected to result in an optimum weight. Because the rim of the steering wheel must be made independently of the hub and of the spokes of the steering wheel and it is necessary to provide a special winding plant comprising subassemblies consisting of bobbin cars for the glass fibers, an impregnating station for the plastic, and a winding shaft and bobbin cores as well as units for control and automatic control, steering wheel skeletons having such a design have not been manufactured thus far.

It is an object of the present invention to provide for steering wheels an injection-molded integral skeleton, which is made of partly crystalline thermoplastic plastic and which meets the static and dynamic requirements as regards static and dynamic strengths and has an adequate functional stiffness and can be made in a comparatively simple manner and can entirely be recycled.

SUMMARY OF THE INVENTION

That object is accomplished in that the skeleton of the steering wheel has a structure which has been produced by press stretching. By press stretching the physical and technical properties of semifinished products made of partly crystalline thermoplastic plastics, such as polypropylene, polyethylene, and polyamide, can highly be improved if such plastics are deformed in a thermoelastic state by a continuous pressing under defined thermal and mechanical conditions. By press stretching the molecules will be oriented along straight lines or along planes if the molecules are uniaxially press-stretched in the longitudinal or transverse direction or are biaxially press-stretched in the longitudinal and transverse directions. This will result in a considerable consolidation of the plastic, i.e., in an increase of its inherent strength.

According to a special feature of the press-stretched steering wheel skeleton only the critical zones, i.e., the rim of the steering wheel, preferably its free top portion, the transitional portions between the rim and the spokes of the steering wheel and between the spokes and the hub of the steering wheel and/or the hub of the steering wheel have a press-stretched structure.

In a preferred steering wheel skeleton the rim and the spokes of the skeleton consist of extruded or bar members, which have been press-stretched uniaxially in the longitudinal direction and which at least in the transitional regions between the rim and the spokes of the steering wheel and between the spokes and the hub of the steering wheel are surrounded by a uniaxially press-stretched plastic layer, the molecules of which extend at right angles to the circumferential direction of the rim of the steering wheel and which is made of the same plastic as the extruded or bar members.

To make the steering wheel skeleton, a preform is made by injection molding and is heated to a temperature that is below the melting temperature of the crystallites of the plastic and is subsequently press-stretched.

If the inherent strength of the steering wheel skeleton is to be increased only in parts of the skeleton, additional material will be provided in those portions of the preform which are to be press-stretched.

A further feature of the process resides in that the press stretching is effected at a temperature which is 5° to 45° C. below the melting temperature of the crystallites of the plastic which is used.

The degree of press stretching is suitably 0.5 to 5, preferably 2.5 to 3.5.

The injection molding, heating, and press stretching of the preform can be carried out in one and the same mold having suitably arranged cavities.

On the other hand, the preform may be injection-molded in a first mold and may be heated and press-stretched in a second mold, which molds have suitable mold cavities. The heat content of the as-molded preform removed from the first mold cavity is suitably utilized in that the preform is pressed in the second mold immediately after the preform has left the first mold.

The invention is illustrated by way of example in the drawings and will be specifically explained hereinafter.

Figure 1:
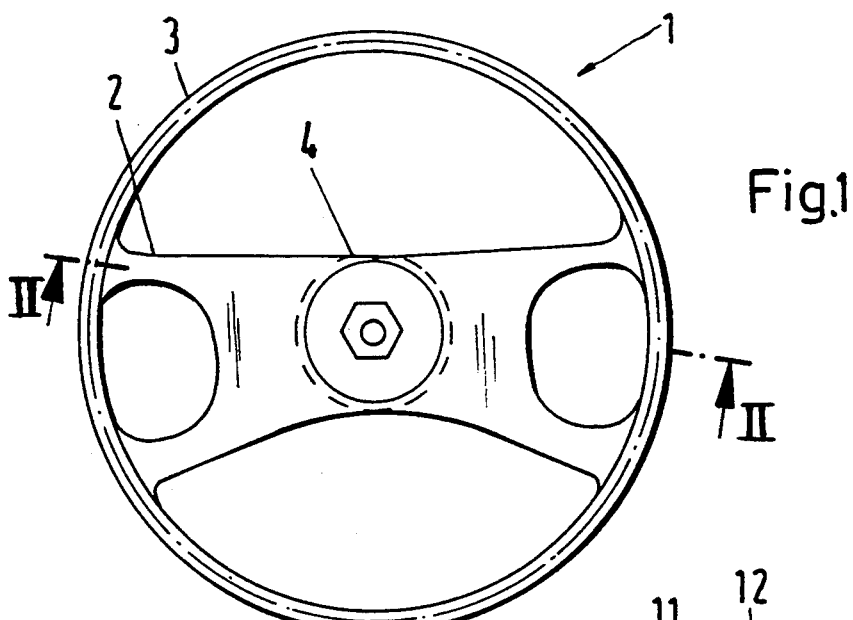
FIG. 1 is a top plan view showing a steering wheel skeleton 1.
Figure 2:
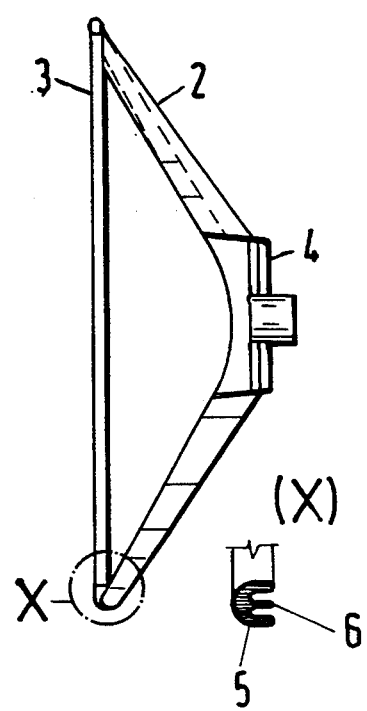
FIG. 2 is a sectional view taken on line I—I in FIG. 1.

Referring now more particularly to the drawings, in FIG. 1 the hub 4 of the steering wheel is connected to the rim 3 of the steering wheel by the spokes 2 of the steering wheel and is disposed below the plane of the rim 3 of the steering wheel. The preform of the steering wheel skeleton 1 is made from polypropylene by injection molding and is subsequently heated to a temperature in the range of 165° C. to 168° C. adjacent to the rim 3 of the steering wheel in a mold having a free mold cavity, in which the rectangular-section rim 3 of the preform is press-stretched under a pressure of p=300 kg/cm² for a pressing time t=3 min and in such a manner that the molecules of the polypropylene are oriented at right angles to the circumferential direction of the rim 3 of the steering wheel. The press-stretched rim 3 of the steering wheel is trough-shaped, as is indicated at 5 in the detail "X" of FIG. 2, and has a rib 6, which extends along the center line.

Figure 3:
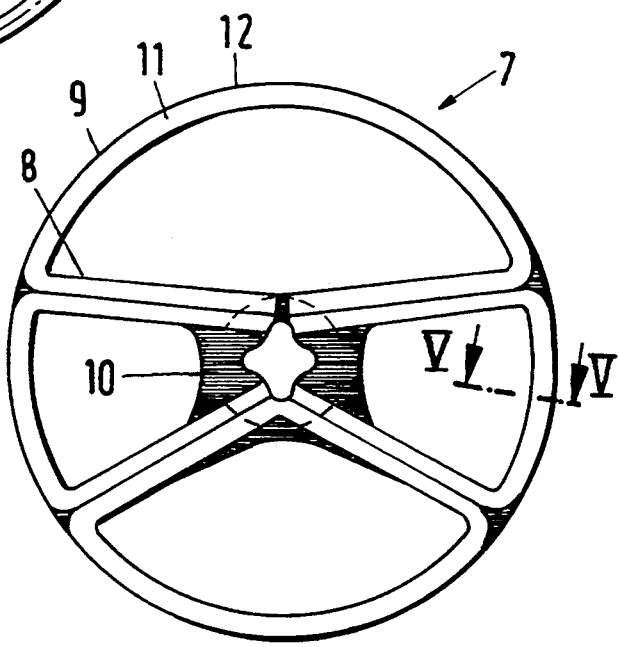
FIG. 3 is a top plan view of another steering wheel skeleton.
Figure 5:
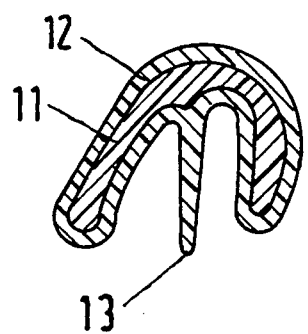
FIG. 5 is a section taken on line V—V of FIG. 3.
Figure 4:
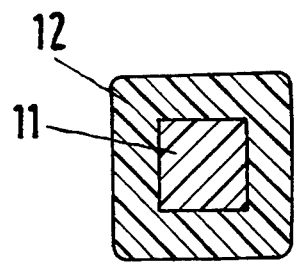
FIG. 4 is a cross-section through a preform of the steering wheel skeleton of FIG. 3.
Figure 6:
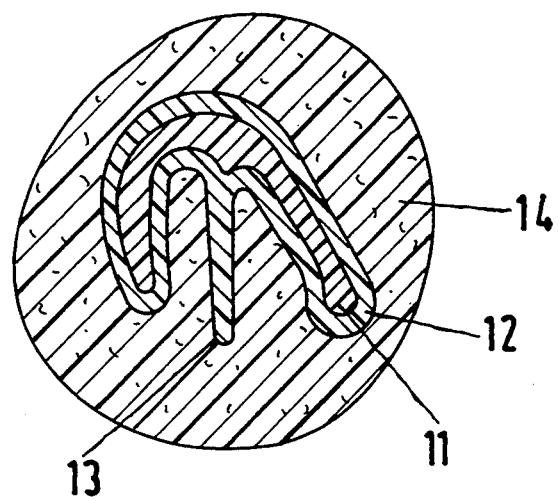
FIG. 6 is a section like FIG. 5, provided with a foam sheath.

FIG. 3 is a top plan view showing a steering wheel skeleton 7, in which the hub 10 of the steering wheel is connected by the spokes 8 of the steering wheel to the rim 9 of the steering wheel and is disposed below the plane of the rim 9 of the steering wheel. To make the preform of the steering wheel skeleton 7, four extrusions 11, which have the shape of a sector of a circle and as shown in FIG. 4 are square in cross-section and have been made of polypropylene and press-stretched by rolling so that their molecules extend uniaxially in the longitudinal direction, are placed one beside the other into a suitably designed mold and are heated therein to a temperature T=140° C. Adjoining legs of the extrusions 11 having the shape of a sector of a circle constitute the spokes 8 of the steering wheel. The extrusions 11 having the shape of sectors of a circle are subsequently covered on all sides by injection molding with a layer 12 of homogeneous polypropylene and the free ends of the legs of the extrusions are embedded in the hub 10 of the steering wheel as said hub is injection molded. In a mold having a free mold cavity, that preform is then heated to a temperature T=110° C. adjacent to the rim 9 and the hub 10 of the steering wheel and the rim 9 and the hub 10 of the steering wheel are press-stretched under a pressure p=300 kg/cm² for a pressing time t=2 min. As a result, the molecules of the polypropylene of the rim 9 of the steering wheel are uniaxially oriented at right angles to the direction of the molecules in the extrusions 11. The molecules of the hub 10 of the steering wheel extend in the direction of flow of the plastic material. FIG. 5 is a transverse sectional view taken on section line II—II in FIG. 3 and showing the steering wheel rim 9 when it has been press-stretched. The rim 9 of the steering wheel has the shape of an asymmetrical trough or rib and comprises a rib 13 extending along the center line. FIG. 6 is a transverse sectional view showing the steering wheel rim 9 of FIG. 5, which is provided with a sheath 14 made of polyurethane integral foam.

The advantage afforded by the invention resides particularly in that the steering wheel skeleton designed in accordance with the invention when compared with a metal skeleton of conventional type is lighter in weight by more than 30%. Because the steering wheel skeleton is made of one and the same plastic, it can be recycled without difficulty. Owing to the low affinity between the steering wheel skeleton and the sheath made of polyurethane integral foam the sheath can easily be detached and removed from the steering wheel skeleton so that the polyurethane foam can also be recycled.

By press stretching it is possible to make steering wheel skeletons having different physical and technological properties. That advantage will be particularly significant in the manufacture of skeletons for steering wheels provided with air bags because the rims of such skeletons are required to have high mechanical strengths whereas the spokes of the steering wheel must be capable of dissipating energy. Besides, the relatively heavy weight of the air bag module can be compensated in part. The plastic extrusions having an increased inherent strength have a uniform elongation and for this reason do not tend to exhibit a brittle failure.

The steering wheel skeleton designed in accordance with the invention meets all functional criteria for passive safety:

Steering wheel impact crash test with dummy (U.S. Act 571,208)
Torso impact (U.S. Act 571,203 and ECE 12)
Head impact (ball pendulum, reduced mass of 6.8 kg, ball diameter 160 mm)
Torsional strength
Static bending test
Dynamic bending test

What is claimed is:

1. A steering wheel suitable for the steering system of a motor vehicle, comprising a steering wheel skeleton which has been made by injection molding from a partly crystalline thermoplastic plastic, optionally sheathed by a plastic layer, at least parts of the skeleton of the steering wheel having a uniaxial structure the molecules of which extend at right angles to the circumferential direction of the rim of the steering wheel.

* * * * *